July 28, 1936.                R. A. GILBERT                2,049,368
                            WELDING ELECTRODE
                          Filed Dec. 24, 1934
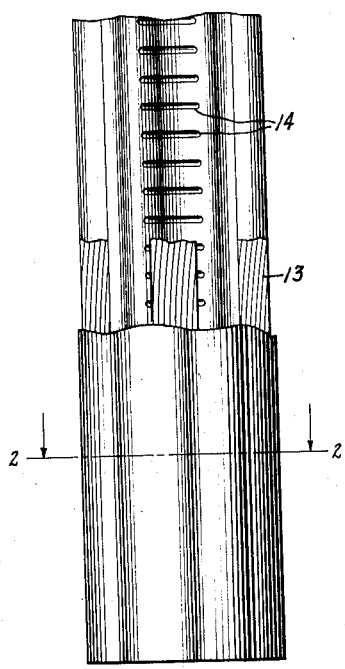
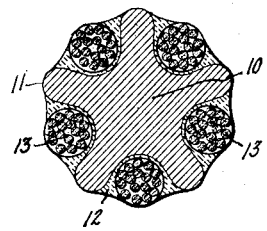
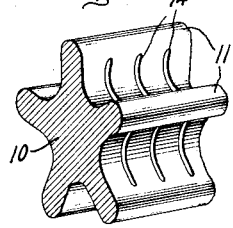
Inventor:
Ralph A. Gilbert,
by Harry E. Dunham
    His Attorney.

Patented July 28, 1936

2,049,368

UNITED STATES PATENT OFFICE 2,049,368

WELDING ELECTRODE

Ralph A. Gilbert, Pittsfield, Mass., assignor to General Electric Company, a corporation of New York Application December 24, 1934, Serial No. 758,927

6 Claims. (Cl. 219—8)

My invention relates to arc welding electrodes.

In order to improve their arcing characteristics as well as the quality of the weld metal, welding electrodes are often provided with a coating of materials called fluxes. Very often these coatings are of considerable thickness and electrically insulate the electrodes, rendering them unsuited for use in most automatic machines or for most hand welding operations unless portions of the flux coating are removed.

It has already been proposed to groove an electrode and to fill the grooves with a fluxing material leaving the parts of the electrode between the grooves uncovered or bared to form a part of the outer surface of the electrode to which the welding current may be applied.

An electrode so constructed cannot be bent or roughly handled without having the flux flake or peel therefrom. Furthermore, the amount of flux which can be applied in the grooves of the electrode is limited because of the tendency of thick strips of flux to crack and fall from the grooves at certain points where the adhesion of the flux to the metallic element of the electrode is imperfect. This produces an electrode in which the flux is not evenly distributed thereon and which will not consequently function uniformly during the welding operation or produce a weld of uniform quality.

It is an object of my invention to provide an electrode having grooves within which a strip of fluxing material is located and held in place by longitudinally extending reinforcing members embedded in the flux.

It is a further object of my invention to provide an electrode of the above construction in which the reinforcing member is formed of a fibrous cord of cellulosic material which during the welding operation is consumed liberating a protective gas shield about the arcing terminal of the electrode and the molten weld metal.

Further objects of my invention will become apparent from a consideration of the following description taken in connection with the accompanying drawing which illustrates one embodiment thereof. In the drawing Fig. 1 illustrates a side view, with parts broken away, of a portion of an electrode constructed in accordance with my invention; Fig. 2 is a sectional view along line 2—2 of the electrode shown in Fig. 1, and Fig. 3 is a view in perspective of a portion of the star-shaped fusible metallic element of the electrode of Figs. 1 and 2 illustrating more fully the corrugated grooves within which the fluxing material is placed.

The metallic element 10 of the electrode illustrated in the drawing is grooved to form a plurality of substantially equally spaced ridges 11 which are parallel to the axis of the rod and extend to and form a part of the outer surface thereof. Strips of fluxing material 12 are located in the grooves between the ridges 11. These strips of flux are reinforced by members 13 which are embedded in the flux and extend lengthwise of the rod.

The ridges 11 may extend slightly beyond the flux strips forming ribs on the outside surface of the electrode, or they may extend just to the surface of the electrode as illustrated in the drawing. The grooves may be knurled as illustrated in order to hold the flux therein more securely. As shown in Figs. 1 and 3 the knurling comprises a plurality of equally spaced notches 14 which extend transversely of the groove formed by the ridges 11.

As has been stated above the flux strip is reinforced by a member which extends longitudinally of the rod and which is embedded in the flux. This member may be formed of a fibrous material such as asbestos, cotton, ramie, linen or the like, or may be formed of a wire. When formed of a wire it may act as a means for introducing alloying elements into the weld deposit. I prefer to make this reinforcing element of a fibrous cord of cellulosic material which is consumed during the welding operation liberating protective gases about the arc and molten metal of the weld.

By reinforcing the flux strip with a member which extends longitudinally thereof the electrode may be bent as well as roughly handled without having the flux separate from the electrode. Those portions of the reinforcing member embedded in the flux which firmly adheres to the rod holds the remaining portions of the flux which would otherwise have a tendency to separate from the rod. The presence of the reinforcing member also facilitates the manufacturing operation since those parts of the flux strip which do not adhere properly to the electrode are held in place by the other portions of the strips which do properly adhere to the electrode.

In the arrangement illustrated the fusible metallic element is of star-shaped cross-section and the points of the star form the ridges which define the flux grooves. It is to be understood that any number of ridges and grooves may be employed, and that these grooves may extend parallel to the axis of the electrode, or may form a spiral about the axis of the electrode. In its simplest form the electrode would consist of a rod having a single spiral groove the turns of which are separated from one another by an intervening ridge which extends to the surface of the electrode.

The electrode may be made by any suitable method of manufacture. I prefer to extrude the flux on to the electrode. When the coating is applied by means of an extruding machine the core rod and reinforcing members are fed into the extruding head in assembled position and the flux is applied in the grooves and about the reinforcing members to produce an electrode such as illustrated. The rib portions of the core rod act to guide the electrode through the extruding nozzle and accurately center it therein. Consequently, the flux applied to the electrode is uniformly distributed over its surface.

It is to be noted that by reason of the fact that portions of the metallic element of the electrode extend to the surface thereof welding current can be supplied to the electrode without removing any of the flux therefrom. For hand welding operations the ribs extending to the surface of the electrode form a handling surface which may be clamped in the electrode holder and through which the welding current may be supplied. In automatic arc welding machines welding current may be supplied to the electrode through these ridges as the electrode is fed through the machine. In such a machine the ridges also form a handling surface with which the feeding mechanism may engage and feed the electrode to the work without destroying the flux coating thereon.

Although I have illustrated and described but one embodiment of my invention, it is apparent that other embodiments will occur to those skilled in the art in view of the above disclosure, and I aim in the appended claims to cover all such modifications and variations as fall within the true spirit and scope of my invention.

What I claim as new and desire to secure by Letters Patent of the United States, is:

1. An electrode comprising a rod grooved to form at least one ridge which extends to and forms a part of the outer surface of said electrode, fluxing material in the grooved portion of said electrode, and a longitudinal reinforcing member embedded in the flux in said grooved portion.

2. An electrode comprising a rod having longitudinal ridges which extend to and form a part of the outer surface of said electrode, fluxing material in the groove between said ridges, and a longitudinal reinforcing member embedded in the flux in said groove.

3. An electrode comprising a rod having a plurality of substantially equally spaced longitudinal ridges which are parallel to the axis of the electrode and extend to and form a part of the outer surface thereof, fluxing material in the grooves between said ridges, and a longitudinal reinforcing member embedded in the flux in each of said grooves.

4. An electrode comprising a rod grooved to form a plurality of substantially equally spaced ridges which are parallel to the axis of said electrode and extend to and form a part of the outer surface of said electrode, strips of fluxing material in the grooves between said ridges, and a reinforcing member embedded lengthwise in the strip of flux in each of said grooves.

5. An electrode comprising a rod having a plurality of knurled grooves which are parallel to the axis of the electrode and substantially equally spaced from one another by ridges which extend to and form a part of the outer surface of the electrode, strips of fluxing material in said grooves, and a reinforcing member embedded lengthwise in the strip of flux in each of said grooves.

6. A welding electrode having a fusible metallic element of star-shaped cross-section the points of which extend to the surface of the electrode and between which there are strips of flux which are reinforced by longitudinally extending members embedded in the flux.

RALPH A. GILBERT.